United States Patent [19]
Sherman

[11] Patent Number: 5,558,173
[45] Date of Patent: Sep. 24, 1996

[54] INTEGRATED HYBRID TRANSMISSION WITH MECHANICAL ACCESSORY DRIVE

[75] Inventor: James F. Sherman, Brighton, Mich.

[73] Assignee: General Motors Corporation, Detroit, Mich.

[21] Appl. No.: 125,901

[22] Filed: Sep. 23, 1993

[51] Int. Cl.6 .................................................. B60K 25/06
[52] U.S. Cl. ........................................ 180/53.8; 180/65.4
[58] Field of Search ................................ 180/65.2, 69.3, 180/53.8, 65.4, 65.3; 290/4 C, 8, 45; 74/11, 15.84, 15.86

[56] References Cited

U.S. PATENT DOCUMENTS

| | | | |
|---|---|---|---|
| 4,024,926 | 5/1977 | Butoi | 180/65.3 |
| 4,165,795 | 8/1979 | Lynch et al. | 180/65.2 |
| 4,489,242 | 12/1984 | Worst | 180/65.1 |
| 5,147,254 | 9/1992 | Baier et al. | 180/53.8 |
| 5,249,637 | 10/1993 | Heidl et al. | 180/53.8 |
| 5,301,764 | 4/1994 | Gardner | 180/65.4 |

*Primary Examiner*—Karin Tyson
*Attorney, Agent, or Firm*—Donald F. Scherer

[57] ABSTRACT

The present invention relates to a power transmission that is interposed between the internal combustion engine and the drive ratio selection transmission of a vehicle. A motor/generator is operatively connected to the power transmission, and the power transmission selectively drives accessories to the internal combustion engine, such as an oil pump, power steering pump and air conditioning compressor. The power transmission employs compounded first and second planetary gear sets. A common gear member serves not only as the ring gear for the first planetary gear set but also as the sun gear for the second planetary gear set. The motor/generator drives the accessories when the internal combustion engine is idling or off, allowing those accessories to be smaller while delivering adequate output.

14 Claims, 5 Drawing Sheets

INTEGRATED HYBRID TRANSMISSION WITH MECHANICAL ACCESSORY DRIVE

TECHNICAL FIELD

The present invention relates generally to vehicular transmissions. More particularly, the present invention relates to a vehicular power transmission that is capable of receiving input torque from both an electric motor and an internal combustion engine.

Specifically, the present invention relates to an integrated hybrid power transmission that is operatively connected to an integral electric motor/generator that not only starts the internal combustion engine, but also augments a friction starting clutch with electrically generated torque and/or electric motor inertia torque for launching movement of the vehicle.

The rotational power input to the normally engine-powered accessories, such as oil pumps, power steering pumps and the like, is provided at the connection of the electric motor/generator to the input of the hybrid power transmission. The input to the accessories is, therefore, continuously rotated with the rotor of the electric motor/generator. This arrangement makes it possible to take advantage of the power provided by, and the rotational rate of, the electric motor/generator, rather than limit the input to the accessories to that receivable directly, and exclusively, from the internal combustion, as has been customary with prior art arrangements.

BACKGROUND OF THE INVENTION

The present invention relates to vehicular power transmissions to coordinate the torque output of an electric motor/generator and an internal combustion engine to a drive ratio selection transmission, and especially to planetary gear sets and the associated torque transfer devices utilized for providing the desired interaction between the internal combustion engine and the electric motor/generator to meet the economic and emission requirements of internal combustion engines to propel vehicles.

The hybrid power transmission disclosed herein drives engine accessories when the internal combustion engine is idling, or even turned off, thereby allowing those accessories to be designed for operation in conjunction with the rotor of the electric motor/generator, the minimum speed of which is on the order of two to three times the idling speed of an internal combustion engine.

Motor/generators have heretofore been employed for launching vehicles. However, the prior art has not appreciated and has not, therefore, disclosed how an integrated motor/generator can be incorporated in the overall operation of a vehicle for more effectively driving accessories, such as the air conditioning compressor and the power steering pump.

SUMMARY OF THE INVENTION

It is, therefore, a primary object of the present invention to provide an integrated hybrid power transmission that permits the normally engine-operated accessories to be driven by the electric motor/generator, either with or without the assistance of the internal combustion engine.

It is another object of the present invention to provide an integrated hybrid power transmission, as above, that utilizes the inertia available from the electric motor/generator to assist in driving the normally engine-operated accessories.

It is a further object of the present invention to provide an integrated hybrid power transmission, as above, wherein the power train provides a greater electrical generating capacity from a motor/generator than is currently available with belt-driven generators.

It is still another object of the present invention to provide an integrated hybrid power transmission, as above, that permits a silent engine start and no engine load in the idle condition.

These and other objects of the invention, as well as the advantages thereof over existing and prior art forms, which will be apparent in view of the following detailed specification, are accomplished by means hereinafter described and claimed.

In general, the present invention relates to a power train for a vehicle having an internal combustion engine to provide one torque source and a drive ratio selection transmission. The power train includes a power transmission that is interposed between the internal combustion engine and the drive ratio selection transmission. In a preferred embodiment, a motor/generator is operatively connected to the power transmission, and the power transmission selectively adds and subtracts torque provided by the motor/generator to the torque provided by the internal combustion engine, and vice versa.

The interconnection provided by the power train between both the internal combustion engine and the motor/generator to the drive ratio selection transmission is accomplished by a power transmission. The power transmission employs compounded first and second planetary gear sets. The first and second planetary gear sets each have a sun gear, a ring gear and a plurality of planetary gears. The planetary gears are mounted on respective first and second carriers operatively to connect the sun and ring gears of the respective planetary gear sets.

Although conventional compounding of the planetary gear sets may be employed, it should also be appreciated that a common gear member may serve not only as the ring gear for the first planetary gear set, but also as the sun gear for the second planetary gear set. The internal combustion engine is adapted selectively to provide torque to the ring and carrier of the second planetary gear set.

Means are also provided operatively to transfer torque between the motor/generator and the sun gear of the first planetary gear set and selectively to the second carrier. Further means selectively transfer torque between the drive ratio selection transmission and the internal combustion engine, the ring gear of the second planetary gear set and the motor/generator, through the second carrier. The first carrier is selectively connected to ground, and means selectively connect the drive ratio selection transmission to ground.

The improved integrated hybrid power transmission provided by the present invention is operative to add or subtract torque from the motor/generator to torque from the internal combustion engine in order to provide the most favorable fuel economy and/or emissions control. The hybrid power transmission also drives the accessories by the internal combustion engine when the engine is idling, thereby allowing the accessories to be smaller.

To acquaint persons skilled in the arts most closely related to the present invention, one preferred embodiment thereof that illustrates a best mode now contemplated for putting the invention into practice is described herein. The written description references the annexed drawings, which form a part of the specification. The exemplary integrated hybrid power transmission is described in detail without attempting to show all of the various forms and modification in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
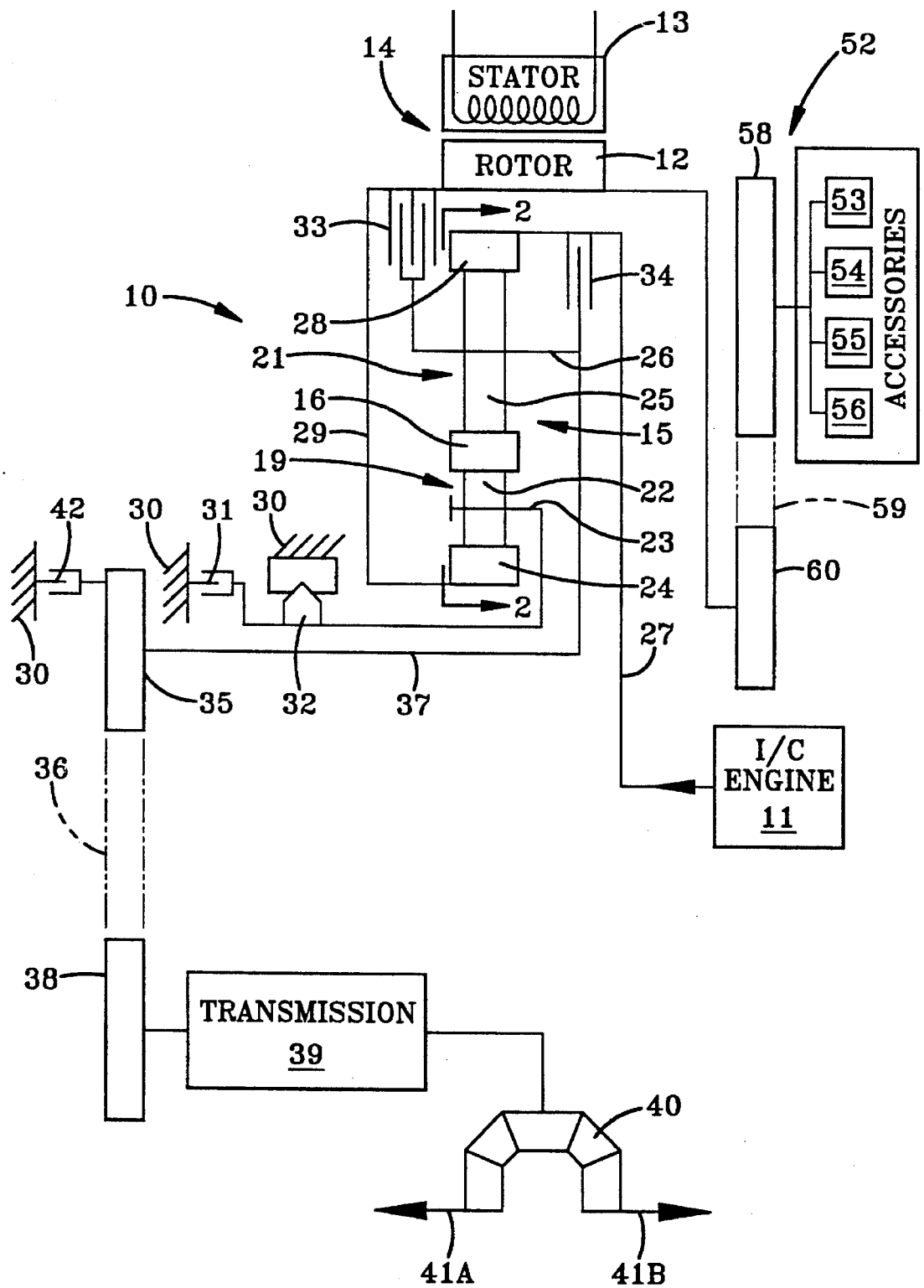
FIG. 1 is a schematic sectional representation of an integrated hybrid power transmission operatively connected to an electric motor/generator and an internal combustion engine to provide torque, through a drive ratio selection transmission, to the final drive of a vehicle, with the accessories customarily operated by the internal combustion engine being operated by the hybrid power transmission.

With reference to the drawings, and particularly FIG. 1, an integrated hybrid power transmission, generally identified at 10, receives input torque from an internal combustion engine, schematically identified at 11, as well as from a rotor 12 that is rotatable relative to the stator 13 of an electric motor/generator, identified generally at 14.

Figure 2:
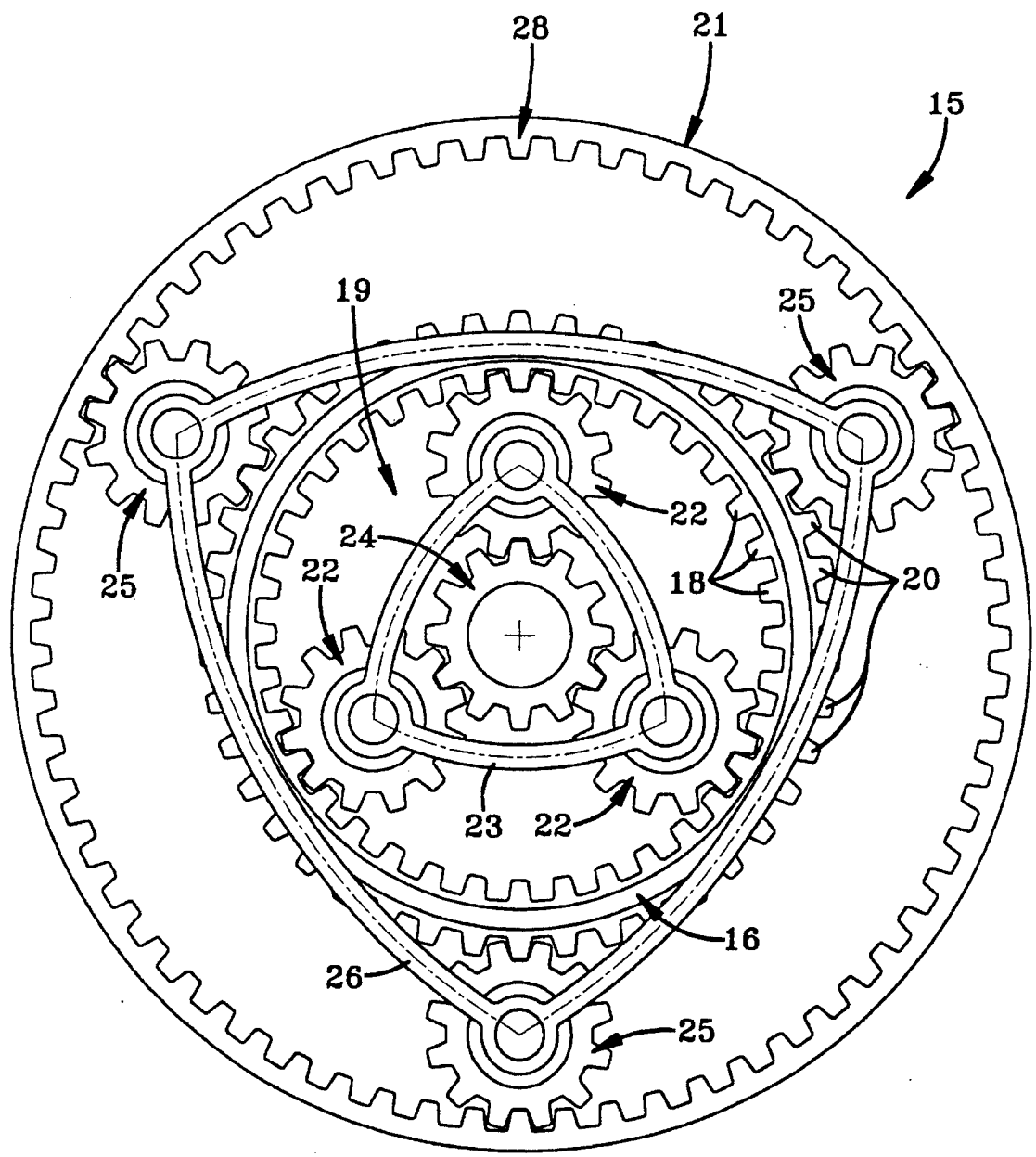
FIG. 2 is an enlarged schematic plan view of a compound planetary gear set particularly adapted for use in conjunction with an integrated hybrid power transmission embodying the concepts of the present invention—one half of that compound gear set is represented in FIG. 1, and that half is designated substantially along line 2—2 of FIG. 1, but FIG. 2 depicts the compound gear set in its entirety.

The integrated hybrid power transmission 10 employs a compound planetary gear set that is identified generally by the numeral 15 in FIGS. 1 and 2. The compound planetary gear set 15 is fully described in my copending U.S. patent application, Ser. No. 08/054,799, filed on Apr. 27, 1993, now U.S. Pat. No. 5,285,111, assigned to the assignee of the present invention. The aforesaid compound planetary gear set 15 utilizes a common connecting gear 16. The radially inner surface of the connecting gear 16 is provided with a plurality of teeth 18 that allow the connecting gear 16 to serve as a ring gear in one planetary gear set 19 in the compound planetary gear set 15. The connecting gear 16 is also provided with a plurality of teeth 20 that allow the connecting gear 16 to serve as a sun gear in a second planetary gear set 21 of the compound planetary gear set 15. As such, the common connecting gear 16 simultaneously serves as a sun gear and as a ring gear.

With reference to the first planetary gear set 19, the teeth 18 which allow the common connecting gear 16 to serve as a ring gear meshingly engage a plurality of pinion or planetary gears 22 that are connected by a carrier 23. The planetary gears 22 are also meshingly engaged with a sun gear 24. Thus, the sun gear 24, the planetary gears 22 mounted on the carrier 23 and the teeth 18 which serve as the ring gear portion of the common gear 16, constitute the first planetary gear set 19.

With reference to the second planetary gear set 21, the teeth 20 which allow the common connecting gear 16 to serve as sun gear in the second planetary gear set 21 meshingly engage a plurality of pinion or planetary gears 25 that are connected by a carrier 26. The planetary gears 25 are also meshingly engaged with a ring gear 28. Thus, the teeth 20 which allow the common gear 16 to serve as a sun gear, the planetary gears 25 mounted on the carrier 26 and the ring gear 28 constitute the second planetary gear set 21.

It should also be observed that the ring gear 28 on the second planetary gear set 21 is permanently connected to the internal combustion engine 11 by virtue of a transmission input shaft, as represented by line 27 in FIG. 1. A damper, not shown, may be added between the ring gear 28 and the engine 11 to reduce engine torque pulsations.

The sun gear 24 in the first planetary gear set 19 is permanently connected by a link or hub 29 (FIG. 1) to the rotor 12 of the electric motor/generator 14, such that those two structural elements of the integrated hybrid power transmission 10 will only rotate: in unison.

The carrier 23 of the first planetary gear set 19 is selectively connected to ground 30 through a torque transfer device in the nature of a friction brake 31. A one-way clutch 32 is also interposed between the carrier 23 and ground 30 in order to assure that the carrier 23 can only rotate in one direction.

The common connector gear 16 is engaged solely by the planetary gears 22 and 25 of the first and second planetary gear sets 19 and 21, respectively.

The carrier 26 in the second planetary gear set 21 is selectively connectible to the rotor 12, as through a first torque transfer device 33. The carrier 26 is also selectively connectible to the ring gear 28 of the second planetary gear set 21 through a second torque transfer device, in the nature of a clutch 34. The carrier 26 is, in addition, permanently secured to an output sleeve shaft, represented by line 37 in the drawings. The sleeve shaft 37 is connected to a pulley 35 which constitutes the output member by which torque is transferred—as by a chain drive 36—from the integrated hybrid power transmission 10 to an input pulley 38.

The input pulley 38 is presented from a standard drive ratio selection transmission 39 that may also incorporate one or more planetary gear sets, as is well known in the art. As is also conventional, the drive ratio selection transmission 39 may be connected, as through a differential 40, to the final drive shafts or axles 41A and 41B of the vehicle, not shown, in which the integrated hybrid power transmission 10 is utilized.

Finally, the pulley 35—to which the carrier 26 of the second planetary gear set 21 in the integrated hybrid power transmission 10 is permanently secured—is itself selectively connected to ground 30 through a torque transfer device in the nature of a brake 42.

In most prior art designs, accessories are driven through belt connections to the internal combustion engine. Such accessories include oil pumps, power steering pumps, air conditioning compressors, transmission oil pump, etc. Because such accessories are generally belt-driven from the internal combustion engine, the efficiency of their operation is subject to the speed at which the engine is operated. Therefore, the accessories must be sized to operate effectively at the lowest engine speed normally encountered—i.e., the speed of the engine when it is idling. It is only when the internal combustion engine is rotating at speeds well above the idle speed—i.e.: within the normal operating range —that all accessories are functioning well within their capabilities.

Because the accessories must heretofore have been sized to provide adequate output when the engine is idling, they have excess capacity at normal engine operating speeds. This over-capacity leads to unnecessarily high initial costs in providing the accessories for the vehicle, and adds unnecessary weight and bulk to the vehicle. The excess weight and bulk contribute to poor fuel economy and crowded engine compartments.

The innovative hybrid power transmission disclosed herein provides an opportunity to utilize smaller accessories with less design capacity by driving such accessories from the hybrid power transmission rather than directly from the internal combustion engine.

In the invention disclosed herein, the accessories are driven by the connection of the electric motor/generator to the hybrid transmission. The minimum rotational speed of the electric motor/generator is approximately three to four times the rotational speed of an internal combustion engine in the idling condition. When the internal combustion engine is operating at a speed above the idle condition, the accessories are driven by the engine at the engine speed. The accessories may also be driven by the electric motor/generator when the internal combustion engine is not operating.

The accessory drive may also be moved from the front of the engine to a position between the engine and the hybrid transmission input. The invention can also be used with an automatic or manual transmission.

With continued reference to FIG. 1, the power transmission 10 is shown with an accessory drive 52 connected to accessories, such as a power steering pump 53, an air conditioning compressor 54, an engine oil pump 55 and a transmission fluid pump 56. The accessory drive 52 is driven by the rotor 12 of the motor/generator 14 and is connectible by the torque transfer device 33, through the carrier 26, to the torque transfer device 34. This arrangement makes the engine 11 available for driving the accessory drive 52.

As depicted, a drive pulley 58 on the accessory drive 52 may be connected, as by a chain 59, to an accessory drive pulley 60. By selecting the relative diameters of the pulleys 58 and 60, the accessory drive 52 will be operable at speeds between 1.5 and ten times the speed of the internal combustion engine 11.

Lever Analysis

Because of the complexity of planetary gear systems and their associated components, when incorporated in vehicular transmissions, transmission engineers and designers have developed and employ, a schematic convention called "stick diagrams" to represent a "lever analysis" by which to facilitate the depiction, and an understanding, of how particular transmissions, even those which employ complex planetary gear sets, operate. The diagrammatic lever analysis provided by these stick diagrams are readily developed into free body diagrams, the essential tool of mechanical analysis. As such, the operation of the present integrated hybrid power transmission will now be presented with the assistance of the stick diagrams set forth in FIGS. 3 through 8.

In the lever analysis depicted in FIGS. 3 through 8, the compound planetary gear sets 19 and 21 are represented by levers bearing the same numerical identification, and the common gear 16 to those two planetary sets is represented by the rigid connecting link 16 that extends between the point 18 on lever 19 and point 20 on lever 21. This depiction, therefore, represents the common gear 16 that presents the ring gear teeth 18 for planetary set 19 as well as the sun gear teeth 20 for the planetary set 21.

The rotor 12 is represented as being permanently connected, as by the link 29, to the point 24 of the lever 19 (i.e.: the first planetary gear set) that represents the sun gear. The carrier is represented by point 23 on lever 19, which is connected to ground 30 not only through the one-way clutch 32 but also through the selectively operable torque transfer brake device 31.

With the second lever 21 representing the second planetary gear set, the point 28 represents the internal gear that is connected to the internal combustion engine 11 by the rigid link 27 (the transmission input shaft). The carrier of the second planetary gear set 21 is represented by point 26 on the lever 21. The carrier 26 is also represented as being connected to ground 30 through torque transfer brake device 42, as well as to the drive ratio selection transmission, as represented by output pulley 35.

It should also be understood that the motor/generator 14 may be controlled through the use of a system, such as that described in U.S. Pat. No. 4,883,973 issued Nov. 28, 1989, to Lakey, etal. and assigned to the assignee of the present invention.

Engine Start Mode

Figure 3:
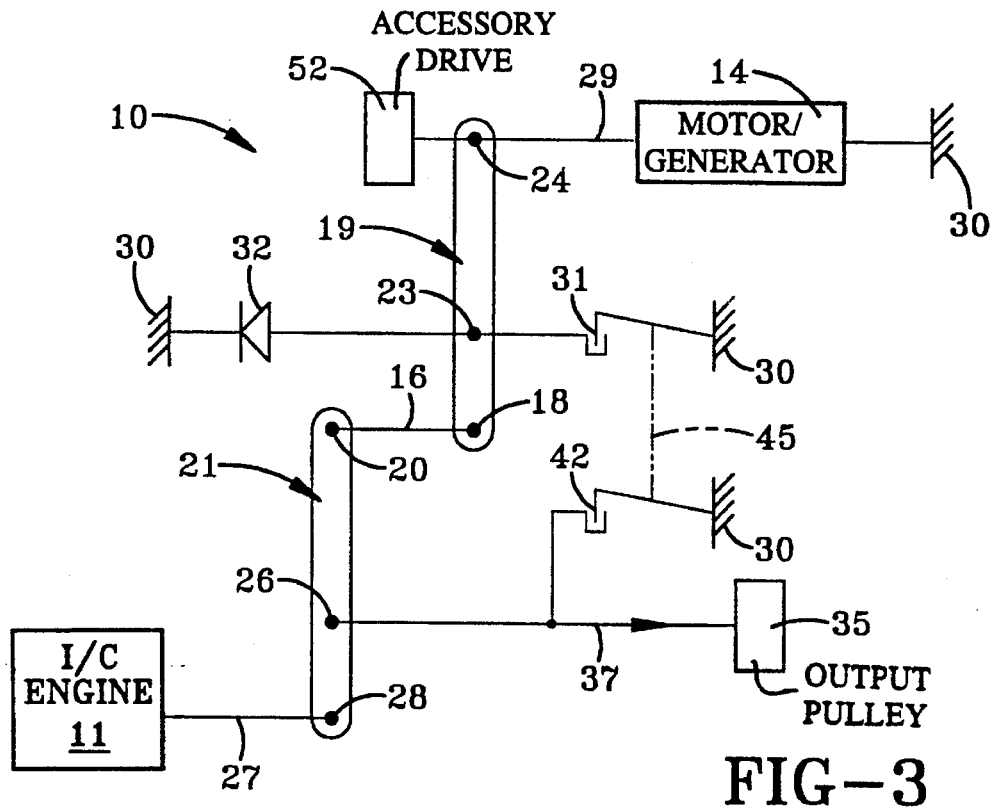
FIG. 3 is a diagrammatic representation—commonly referred to as a "Lever Analysis"—of the compound planetary gear arrangement employed in an integrated hybrid power transmission represented in FIGS. 1 and 2, and depicting the compound planetary gear arrangement of the power transmission in the Engine Start Mode.

Referring to FIG. 3, a lever analogy for the power transmission 10 is presented to depict starting the internal combustion engine 11 by the torque applied from the motor/generator 14. Both the carriers 23 and 26 are grounded through the respective torque transfer devices 31 and 42, which, therefore, are acting as brakes. Grounding may be accomplished by simultaneously actuating the brakes 31 and 42 by virtue of a park lever, as represented by the dashed lines 45. By thus grounding the carriers 23 and 26, a reactive speed ratio may be established between the motor/generator and the crank shaft of the internal combustion engine 11.

The crank shaft may be schematically represented by the connecting line 27 that extends between the internal combustion engine 11 and the ring gear 28. By appropriate selection of the relative numbers of teeth on the sun and ring gears in each planetary set 19 and 21 in the compound set 15, a reactive speed ratio on the order of approximately 4:1 may be established. This ratio dictates the motor/generator torque. A silent start may be attained with this arrangement.

Obviously, the internal combustion engine can only be started in this manner when the Park or Neutral Mode of the power transmission is employed. High generator output is also available in the Park or Neutral Mode. Prevention of gear rattle and a reduction in crank shaft pulsations may also be obtained by the provision of some reactive torque by the motor/generator 14. When employing an oil pump not driven by the internal combustion engine 11, brake 48 and automatic transmission brakes and clutches (torque transfer devices that ground the transmission input) may be actuated in Park or Neutral Mode for engine start. Automatic transmission operation with the hybrid transmission 10 is effected by shifting from the Park or Neutral Mode to a Drive Mode.

It should also be appreciated that the generator field is reduced for shift feel when the carriers 23 and 26 are freed from ground by manipulation of the park lever 45.

Figure 5:
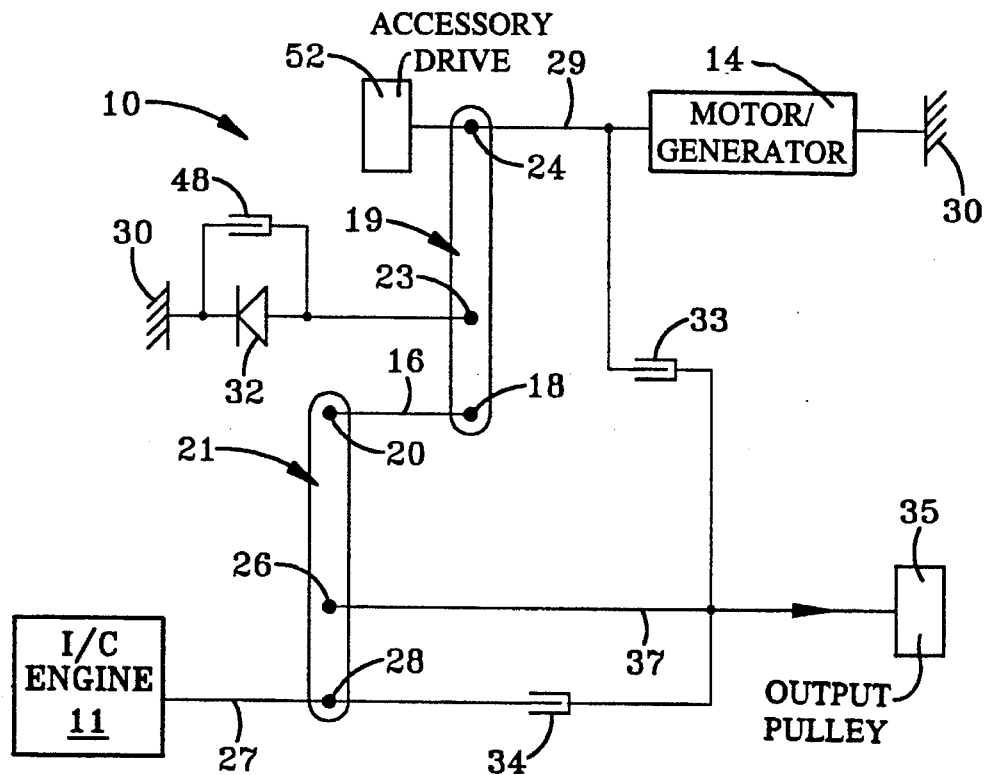
FIG. 5 is a diagrammatic representation similar to FIGS. 3 and 4 depicting a lever analysis of the compound planetary gear arrangement in the power transmission when in the Vehicle Launch Mode.

A variation of the Starting Mode may be achieved by replacing the dog clutch form of torque transfer device 31 with a friction clutch type of torque transfer device 48, as depicted in FIG. 5. With this configuration, a pre-lube of the internal combustion engine 11 and the transmission 10 may be provided by incorporating a switch, not shown, that energizes the electric motor/generator 14 when the driver's door is open, thus driving the oil pumps 55, 56 and 53 for the engine, transmission and power steering, respectively. The one-way clutch 32 on the carrier 23 overruns. The internal combustion engine 11 is started by engaging the friction clutch 48. This friction clutch 48 must be able to hold the carrier reaction torque of approximately two times the torque of the electric motor 14.

This embodiment of the invention allows the internal combustion engine 11 to be stopped while maintaining full accessory operation and engine start in park or drive. In the drive range position, an automatic transmission requires proper transmission clutches charged for launch and service brakes applied with sufficient pressure to hold reaction forces on the engine carrier 26 (transmission input).

For a manual transmission, the engine can be started in gear, with clutch pedal released and the brakes applied with sufficient pressure to hold the reaction forces on the engine carrier 26. If the engine 11 is started in drive with an automatic transmission, reaction for the engine gear set carrier 26 may be provided by the application of two or more friction elements within the transmission to prevent rotation of the transmission input shaft 37.

Vehicle Launching Mode

The Launching Mode is described in detail in my copending U.S. patent application, Ser. No. 08/054,799, but it will be repeated herein in order to facilitate an overall understanding of the present invention.

With the engine running and in Launching Mode, the flywheel inertia of ring gear 28, and the attached components, react in both positive and negative directions with the crankshaft. The flywheel inertia of rotor 12 and the attached components react only in the positive or forward direction through one-way clutch 32, thereby requiring less energy to maintain the engine speed, while reducing idle shake.

With specific reference to FIG. 5, a lever analogy for the power transmission 10 is presented to depict launching of the vehicle. Two methods of launch may be used. The first—designated as the heavy throttle, inertia-assisted method—uses the motor/generator torque transfer device 33 as a launching clutch. For example, with the internal combustion engine ill operating at 600 RPM and the rotor 12 of the motor/generator 14 revolving at 2,300 RPM—a 3.86 ratio—the accelerator is depressed. Reaction is through the one-way clutch 32 to ground 30.

The internal combustion engine 11 is operated in a manner that would effect acceleration of the vehicle. The motor/generator 14 would also be accelerated. However, the motor/generator clutch 33 is applied to decelerate the motor/generator 14 at a controlled rate. The internal combustion engine 11 maintains its speed., and the torque resulting from the inertia of the rotor 12 is added to the torque applied by the internal combustion engine 11 during initiation of the launch. As the differential speed across the motor/generator clutch 33 decreases, the torque of the motor/generator 14 is increased to maintain a controlled rate of application to synchronous speed lock up.

The second or alternative method of launching a vehicle with the power transmission 10 is designated as the light to mid-throttle generator reaction launch. The light to mid-throttle generator reaction launch is accomplished by directing the launch reaction through the one-way clutch 32 to ground 30 and by controlling the speed by the motor/generator 14 through an electric, brake reaction to ground 30. With the internal combustion engine 11 operating at 600 RPM and the rotor 12 of the motor/generator 14 revolving at 2,300 RPM, the accelerator is depressed. The reaction is through the one-way clutch 32 to ground 30, and the internal combustion engine 11 is operated in a manner that would effect acceleration of the vehicle. This would normally accelerate rotation of the motor/generator 14.

However, deceleration is provided by reversing the field of the stator 13, thereby causing the motor/generator 14 to act as an electric brake. This motor/generator reaction serves to charge the battery and also controls the rate at which the vehicle is accelerated. In this way it is possible to effect the desired acceleration with decreased throttle application in order to provide maximum economy of operation and to achieve the desired emission reduction, during the launch phase. The motor/generator clutch 33 may be applied at, or near, the synchronous speed and the motor/generator torque adjusted for the most desirable interaction.

It should also be appreciated that a bridging torque transfer device in the nature of a brake 48 may be added in parallel with the one-way clutch 32 to provide an alternative means by which to effect torque reversal—i.e.: to simulate electric field reversal and to effect regenerative braking—when the motor/generator clutch 33 is not applied. That is, the rotor 12 of the motor/generator 14 rotates in the same direction as the internal combustion engine 11, and at a speed three to four times greater than the speed of the internal combustion engine 11 when the vehicle is stopped. This relative speed differential provides reaction for launch of the vehicle and inertia for virtually eliminating the undesirable jerking that might otherwise be felt when the motor/generator clutch 33 is actuated.

In either situation, it should be apparent that after the engine 11 starts, the friction clutch 48 is released and, if in automatic drive or any manual gear transmission, the electric motor 14 will supplement the accessory drive 52, reduce crank shaft torque spikes, provide constant torque to gear sets to prevent gear rattle and provide a desired amount of creep torque at transmission input. With a manual transmission in automatic launch mode the clutch pedal will not become active until depressed.

With the electric motor 14 connected, as by a clutch 33, to the output sleeve shaft 37 and the transmission input shaft 27 the rotational speed of the accessory drive 52 will be the same as the rotational speed of the output pulley 35.

Motor/Generator Coupling Mode

Figure 6:
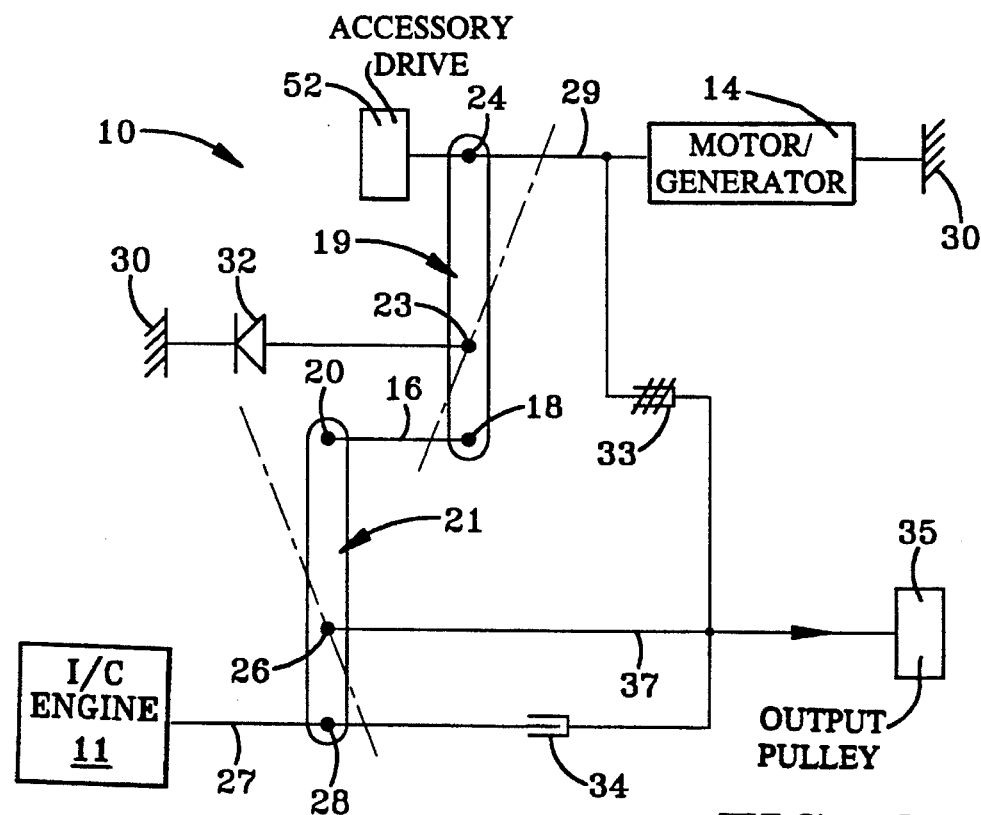
FIG. 6 is a diagrammatic representation similar to FIGS. 3–5 depicting a lever analysis of the compound planetary gear arrangement in the power transmission when in the Motor/Generator Coupling Mode.

Referring to FIG. 6, a lever analogy for the power transmission 10 is presented to depict the motor/generator coupling phase after the motor/generator clutch 33 is engaged and the output torque ratio is increased, as for example, from 1.5:1 to 1.7586:1 times the torque supplied by the internal combustion engine 11. In this condition, the torque of the motor/generator 14 may be added or subtracted from the multiplied torque of the internal combustion engine 11. The resulting axial torque controlled by the motor/generator 14 assures the desired best performance by selectively optimizing the operation of the internal combustion engine throttle opening for best fuel economy and desirable emissions.

Internal Combustion Engine Coupling Mode

Figure 7:
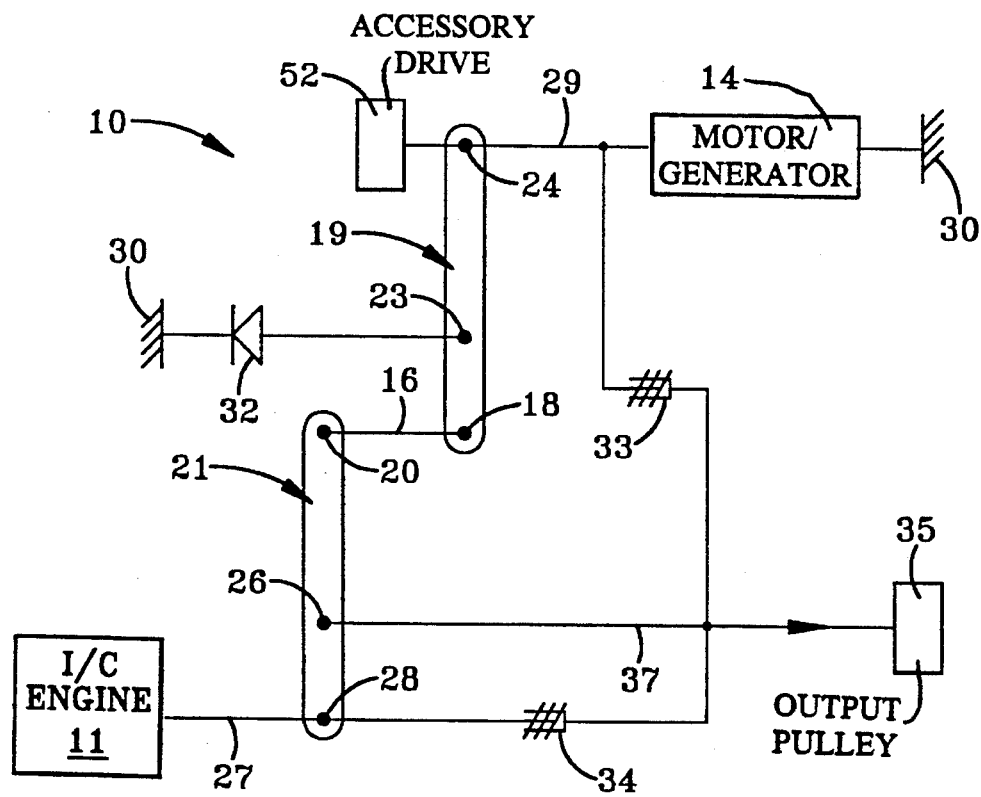
FIG. 7 is a diagrammatic representation similar to FIGS. 3–6 depicting a lever analysis of the compound planetary gear arrangement in the power transmission when in the Internal Combustion Engine Coupling Mode; and, FIG. 8 is a diagrammatic representation similar to FIGS. 3–7 depicting a lever analysis of the compound planetary gear arrangement in the power transmission when in the Reverse Mode.

Referring to FIG. 7, the lever analogy for the power transmission 10 is presented to depict the condition of the planetary mechanism 10 with the application of the engine torque transfer device (clutch) 34. The torque ratio changes from 1,786:1 to 1:1 times the engine torque. During this ratio change, and all subsequent transmission ratio changes, the motor/generator 14 may be used to bias the axial torque before, during and after the shifting or application of the engine torque clutch 34, resulting in less disturbance.

Regeneration Mode

Figure 4:
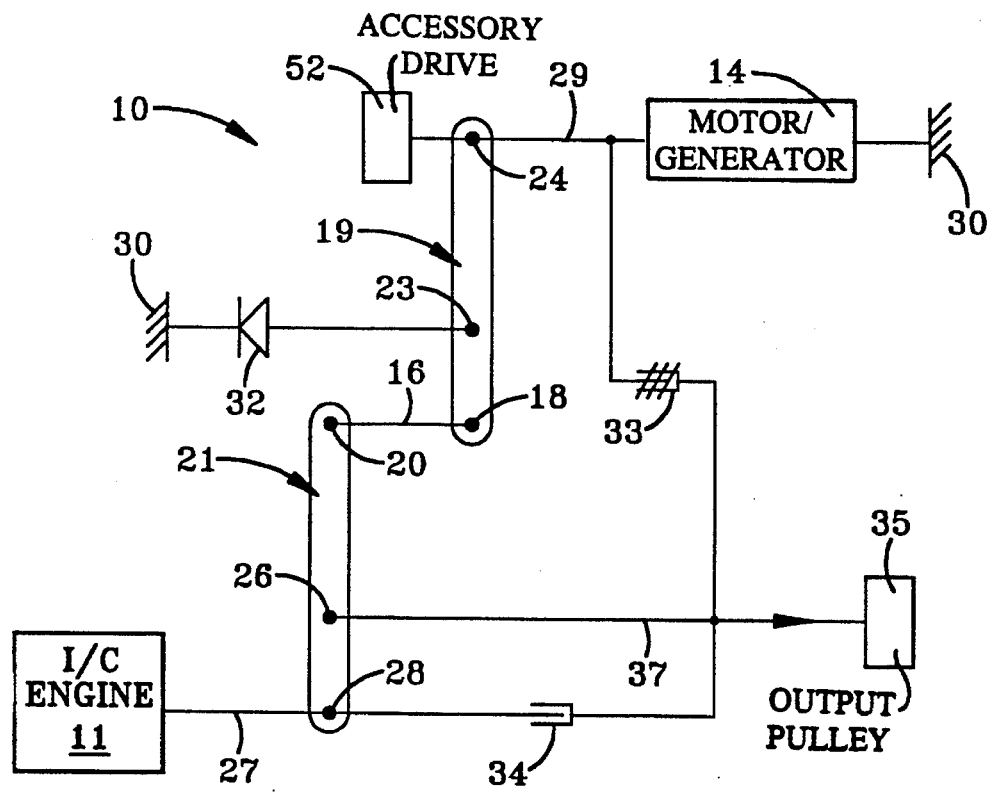
FIG. 4 is a diagrammatic representation similar to FIG. 3 depicting a lever analysis of the compound planetary gear arrangement in the power transmission when in the Regenerative Mode.

Referring to FIG. 4, the lever analogy for the power transmission 10 is presented to depict the regeneration mode—i.e.: that mode whereby energy may be recovered when operating with the engine torque clutch 34 disengaged during deceleration and with the motor/generator clutch 33 engaged so that the motor/generator 14 remains coupled to the output sleeve shaft 37—which remains coupled to the final drive shafts, or axles, 41—for maximum energy recovery. The speed of the internal combustion engine 11 may be reduced. However, the speed of the internal combustion engine 11 may have to be increased in order to assist the motor/generator 14 should the driver seek to accelerate the vehicle.

The present power transmission makes two torque ratios available when operating in the Regeneration Mode. For example, if the speed of the internal combustion engine 11 is increased, the one-way clutch 32 will react to ground 30 and—with the same relative number of teeth on the sun and ring gears in the compound planetary gear sets 19 and 21 as heretofore assumed—a power ratio of 1.7586:1 will be automatically provided. On the other hand, if the engine clutch 34 is reapplied, a ratio of 1:1 will result.

During deceleration, the system operation is determined by driver input as well as the state of the battery charge. If a maximum charge is required, the power transmission 10 will drive the motor/generator 14 for the maximum output. If a minimum charge is required, the power transmission 10 will drive the motor/generator 14 at the optimum torque range before the system blends in the service brakes. In the event the service brake time, or temperature, becomes excessive, the engine clutch 34 would engage to provide engine braking.

Motor/Generator Only Mode

Only limited performance is available when driving the vehicle through the power transmission 10 solely by the motor/generator 14, as represented by the lever analogy presented in FIG. 4.

Manual Transmission Options

The above-described power transmission 10 may also be used with manual ratio control systems. Starting the internal combustion engine 11 with a manual drive ratio system is the same as with an automatic drive ratio system. That is, both carrier assemblies 23 and 26 must be grounded for reaction.

During the Motor/Generator Coupling Mode and the Internal Combustion Engine Coupling Mode, operation with a manual drive ratio selection transmission is the same as with an automatic drive ratio selection transmission. Once both the engine clutch 34 and the motor/generator clutch 33 are applied, two methods of manual shifting are available. With the first method, both the engine clutch 34 and the motor/generator clutch 33 are switched over to manual clutch pedal control, and gear synchronization may be achieved with synchronizers well known to those skilled in the art. Alternatively, the engine clutch 34 may be switched over to pedal control. When the engine clutch 34 is pedal actuated, and the motor/generator clutch 33 is engaged, the motor/generator 14 provides precise control over the speed of the power transmission 10 output sleeve shaft 37. However, when the shift lever of the manual drive ratio selection transmission is moved into the next drive select gate, the motor/generator 14 is regulated to provide the synchronous speed necessary for the drive ratio selected. By eliminating the transmission synchronizers the cost of the input differential may be offset.

Another alternative manual transmission method during launch includes providing sequential manual control of first, the motor/generator clutch 33 and sequentially thereafter the engine clutch 34.

Using the power transmission 10 in the Regeneration Mode may be accomplished with a manual drive ratio selection transmission in the same manner as previously described herein for the automatic drive ratio selection transmission. Operation in the Motor/Generator Only Mode with the manual drive ratio selection transmission may be provided during launch from a stopped condition with the motor/generator 14, but with the motor/generator clutch 33 applied. Alternatively, the motor/generator 14 may be rotated with the motor/generator clutch 33 manually applied to utilize the torque supplied by the inertia of the rotor 12 in the motor/generator 14, and any associated flywheel.

Releasing the motor/generator clutch 33 may be necessary for changing gears, if total synchronization is not possible. Also, a reverse transmission gear would be required to reverse the vehicle.

It should be understood that in normal cruising operation, the internal combustion engine 11 is the prime power source, and the motor/generator 14 provides additional power for vehicle demands, such as passing, without gear change, and going up hill. The motor/generator 14 also is controlled for providing the desired battery charge by recovering power as the vehicle is going down hill and/or decelerating. Controls may also be utilized to manipulate the internal combustion engine throttle for best fuel economy and improved engine emissions.

Electric Reverse Operation

Figure 8:
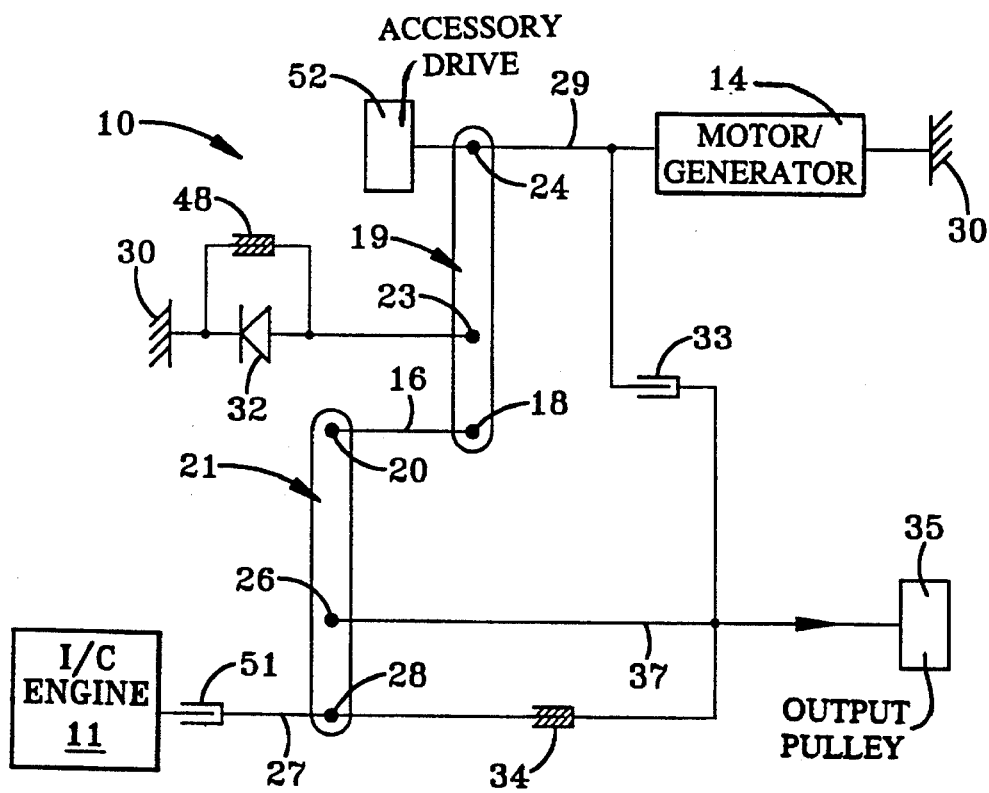

With reference to FIG. 8, it can be observed that a bridging torque transfer device in the nature of a clutch 51 provides a means for effecting complete disconnection of the internal combustion engine 11 from the transmission 10. Reverse drive operation is provided by engaging both clutch 34 and brake 48 and selecting a forward ratio, preferably first gear, in the transmission. Thus, if the engine 11 becomes inoperable, the vehicle can be moved by utilizing the motor/generator 14, just the same as the motor/generator continues to be able to operate the accessory drive 52.

Driving Accessories By Hybrid Transmission

With reference to FIG. 5, the accessory drive 52 is shown with the internal combustion engine 11 stopped. For engine restart, the ratio transmission 35 inputshaft 37 must be grounded. With motor 14 driving accessories, including transmission fluid pump 56, pressure is maintained to apply clutch 48, providing reaction for gear set 19. Reaction for gear set 21 is provided by shaft 37, and engine 11 is rotated by motor 14.

Conclusion

From the foregoing description, it should be readily apparent to those skilled in the art that a power transmission is provided utilizing planetary gear sets and clutches which can be configured so that accessories normally operated by an internal combustion engine can be driven by an electric motor/generator.

While only a preferred embodiment, with one minor variation, of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that an integrated power transmission embodying the concepts of the present invention not only permits the accessories to be operated at greater efficiency by the motor/generator but also accomplishes the other objects of the invention.

The embodiments of the invention in which an exclusive property or privilege is claimed are defined as follows:

1. A power train for a vehicle, said power train comprising:

an internal combustion engine to provide a source of torque;

a motor/generator to provide a second source of torque;

a drive ratio selection transmission;

a power transmission;

said power transmission having compounded first and second planetary gear sets;

each planetary gear set having first gear means, second gear means and a plurality of planetary gears mounted on a carrier operatively to connect said first and second gear means of the respective first and second planetary gear sets;

a common gear member serving not only as said second gear means for said first planetary gear set but also as said first gear means for said second planetary gear set;

said internal combustion engine adapted selectively to provide torque to said power transmission through said carrier for said second planetary gear set;

means selectively to transfer torque between said motor/generator and said power transmission through said carrier for said second planetary gear set;

means selectively to transfer torque to and from the drive ratio selection transmission and said internal combustion engine, said means also transferring torque from said internal combustion engine to said power transmission;

said carrier for said first planetary gear set being selectively connected to ground;

means selectively connecting said drive ratio selection transmission to ground;

an accessory drive; and, said accessory drive being operatively connected to said motor/generator and said power transmission.

2. A power train for a vehicle, as set forth in claim 1, wherein:

said motor/generator has a rotor;

said accessory drive is permanently connected to said rotor;

said accessory drive is permanently connected to said first gear means for said first planetary gear set and is selectively connected to said carrier for said second planetary gear set.

3. A power train for a vehicle, as set forth in claim 1, wherein:

said internal combustion engine is permanently connected to one gear means of said second planetary gear set.

4. A power train for selectively driving a vehicular drive ratio selection transmission, said power train comprising:

an internal combustion engine providing a first source of torque;

a power transmission;

said power transmission having compounded first and second planetary gear sets;

each planetary gear set having a plurality of gear members;

one of said gear members in said second planetary gear set being permanently connected to said internal combustion engine;

another gear member in said second planetary gear set being selectively connected to said internal combustion engine;

said gear member in said second planetary gear set that is selectively connected to said internal combustion engine also being operatively connected to said drive ratio selection transmission;

a motor/generator;

said motor/generator providing a second source of torque;

said motor/generator being selectively connected to that gear member in said second planetary gear set which is selectively connected to said internal combustion engine;

said motor/generator also being operatively connected to a gear member in said first planetary gear set; and, an accessory drive;

said accessory drive being continuously connected to said motor/generator and selectively connected to said gear member of said second planetary gear set to which said internal combustion engine is selectively connected.

5. A power train as set forth in claim 4, wherein:

said accessory drive is also continuously connected to a member in said first planetary gear set.

6. A power train, as set forth in claim 4, wherein:

said accessory drive is driven at between 1.5 times and 10 times the speed of said internal combustion engine when said internal combustion engine is idling.

7. A power train, as set forth in claim 4, wherein:

said accessory drive is driven the speed of said internal combustion engine when said vehicle is moving.

8. A power train, as set forth in claim 4, wherein:

said accessory drive is driven by said motor/generator when said internal combustion engine is off.

9. A power train, as set forth in claim 4, wherein said power train further comprises:

an accessory, said accessory being driven by said accessory drive and being sized for operation at an engine speed greater than idle.

10. A power train as set forth in claim 4, further comprising:

a first torque transfer device;

said first torque transfer device being operable to effect selective connection of said motor/generator to a gear member in said second planetary gear set of said power transmission;

said first torque transfer device also being operable to effect selective connection of said accessory drive to one of said gear in said second planetary gear set of said power transmission;

a second torque transfer device;

said second torque transfer device being operable selectively to effect connection of said internal combustion engine to said same gear member in said second planetary gear set of said power transmission.

11. A power train, as set forth in claim 4, further comprising:

a torque transfer device being operable selectively to effect connection of one gear member in said first planetary gear set of said power transmission to ground.

12. A power train, as set forth in claim 4, further comprising:

a torque transfer device being operable selectively to effect connection of said drive ratio selection transmission to ground.

13. A power train, as set forth in claim 4, wherein:

said accessory drive is driven by said motor/generator when said internal combustion engine is idling.

14. A power train, as set forth in claim 4, wherein:

said accessory drive is driven at the speed of said internal combustion engine only when said internal combustion engine is driven at a speed in excess of said motor/generator.

* * * * *